(12) United States Patent
Chase (10) Patent No.: US 11,692,543 B2
(45) Date of Patent: Jul. 4, 2023

(54) SCRAPER RING

(71) Applicant: GD ENERGY PRODUCTS, LLC, Tulsa, OK (US)

(72) Inventor: John Chase, Deer Park, TX (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 300 days.

(21) Appl. No.: 16/953,942

(22) Filed: Nov. 20, 2020

(65) Prior Publication Data
US 2022/0163031 A1    May 26, 2022

(51) Int. Cl.
| | |
|---|---|
| *F04B 53/00* | (2006.01) |
| *F04B 53/16* | (2006.01) |
| *F04B 53/18* | (2006.01) |
| *F16J 9/20* | (2006.01) |

(52) U.S. Cl.
CPC .............. *F04B 53/00* (2013.01); *F04B 53/16* (2013.01); *F04B 53/18* (2013.01); *F16J 9/20* (2013.01)

(58) Field of Classification Search
CPC .......... F04B 53/00; F04B 53/16; F04B 53/18; F04B 53/164; F04B 53/121; F16J 9/20; F16J 9/203; F16J 15/184; F16J 15/183; F16J 15/20; F02F 5/00
See application file for complete search history.

(56) References Cited

U.S. PATENT DOCUMENTS

| | | | |
|---|---|---|---|
| 1,313,320 A | 8/1919 | Miller | |
| 1,372,529 A | 3/1921 | Mastin | |
| 1,389,635 A | 9/1921 | Dunkle | |
| 2,212,291 A | 8/1940 | Heinze et al. | |
| 2,442,687 A | 6/1948 | Heathcott | |
| 2,658,809 A | 11/1953 | Schultz | |
| 2,819,102 A | 1/1958 | Horvath | |
| 2,907,614 A | 10/1959 | Rosen | |
| 3,013,830 A | 12/1961 | Milligan | |
| 3,094,337 A | 6/1963 | Pippert et al. | |
| 3,120,960 A | 2/1964 | Pippert et al. | |
| 3,244,399 A | 4/1966 | Jones et al. | |
| 3,271,039 A | 9/1966 | Kohl et al. | |
| 3,339,932 A * | 9/1967 | Maha | F16J 15/004 277/552 |
| 3,419,280 A | 12/1968 | Wheeler | |
| 3,429,385 A | 2/1969 | Jones et al. | |
| 3,554,563 A * | 1/1971 | Schumacher | F16J 15/20 277/540 |
| 3,719,366 A | 3/1973 | Pippert | |
| 4,219,204 A | 8/1980 | Pippert | |
| 4,440,404 A | 4/1984 | Roach et al. | |
| 4,474,382 A | 10/1984 | Hjelsand | |
| 4,619,436 A | 10/1986 | Bonzer et al. | |

(Continued)

FOREIGN PATENT DOCUMENTS

EP    0229005 B1    4/1989

*Primary Examiner* — Grant Moubry
(74) *Attorney, Agent, or Firm* — Edell, Shapiro & Finnan, LLC (57) ABSTRACT

An annular scraper ring for a packing arrangement is disclosed. The annular scraper ring that can form a seal with a plunger included in a fluid end of a reciprocating pump and includes a planar upstream face and an inner surface with a tapered section. The tapered section tapers away from the plunger along a downstream direction so that the scraper ring is widest at the planar upstream face.

20 Claims, 5 Drawing Sheets

(56) References Cited

U.S. PATENT DOCUMENTS

| | | | |
|---|---|---|---|
| 5,230,520 A * | 7/1993 | Dietle | F16J 15/324 |
| | | | 277/559 |
| 5,738,358 A | 4/1998 | Kalsi et al. | |
| 6,257,850 B1 * | 7/2001 | Conn | F04B 53/143 |
| | | | 417/547 |
| 8,191,460 B2 * | 6/2012 | Tackett, Jr. | F04B 15/04 |
| | | | 277/926 |
| 9,016,693 B1 * | 4/2015 | Shek | F04B 47/00 |
| | | | 277/500 |
| 9,534,691 B2 | 1/2017 | Miller et al. | |
| 9,845,801 B1 * | 12/2017 | Shek | F04B 53/02 |
| D895,777 S | 9/2020 | Chase et al. | |
| 10,837,556 B2 * | 11/2020 | Chase | F04B 53/02 |
| 2002/0121745 A1 * | 9/2002 | Vogel | F16J 15/189 |
| | | | 277/510 |
| 2011/0239856 A1 * | 10/2011 | Tiller | F04B 53/18 |
| | | | 92/153 |
| 2014/0125012 A1 * | 5/2014 | Lee | F16J 15/30 |
| | | | 277/500 |
| 2016/0298768 A1 * | 10/2016 | De Lapersonne | F16J 15/3444 |
| 2019/0085978 A1 | 3/2019 | Chase et al. | |
| 2019/0170137 A1 * | 6/2019 | Chase | F04B 53/164 |

\* cited by examiner

SCRAPER RING

FIELD OF INVENTION

The present invention relates to the field of high pressure reciprocating pumps and, in particular, a sealing arrangement for high pressure reciprocating pumps.

BACKGROUND

High pressure reciprocating pumps are often used to deliver high pressure fluids during earth drilling operations. A sealing arrangement is provided between a pump casing and a reciprocating plunger to reduce the likelihood of leakage and to protect the plunger from potential damage from any abrasive components that may be contained in the fluid being pumped.

SUMMARY

The present application relates to a scraper ring for a packing arrangement of a high pressure reciprocating pump. The scraper ring may be provided independent of any other elements incorporated in a packing arrangement, included in a packing arrangement, and/or incorporated in a reciprocating pump.

More specifically, in accordance with at least one embodiment, the present application is directed to an annular scraper ring for a packing arrangement that can form a seal with a plunger included in a fluid end of a reciprocating pump. The scraper ring includes a planar upstream face and an inner surface with a tapered section that tapers away from the plunger along a downstream direction so that the scraper ring is widest at the planar upstream face. Thus, advantageously, when the scraper ring is compressed, sealing forces acting against radial expansion of the sealing ring (i.e., normal forces) will be largest at and/or adjacent the planar upstream face. This may protect downstream components of the packing arrangement, as well as downstream portions of the scraper ring, from debris (i.e., abrasive materials) while also eliminating any pockets that might encourage a "nibbling" phenomenon that damages sealing elements (i.e., rings).

In at least some embodiments, the tapered section of the inner surface of the scraper ring begins to taper at the planar upstream face. Alternatively, the inner section of the scraper ring may include a cylindrical section disposed between the planar upstream face and the tapered section and the tapered section may begin to taper at a downstream edge of the cylindrical section. Still further, in some embodiments, the tapered section of the inner surface of the scraper ring is a first tapered section and the inner surface also includes a second tapered section disposed between the first tapered section and a downstream face of the scraper ring that is opposite the planar upstream face. Additionally or alternatively, the inner section of the scraper ring can include a cylindrical section disposed between the tapered section and the downstream face of the scraper ring. Various geometries may tailor the sealing forces for specific pump environments, geometries, and the like.

Moreover, in at least some embodiments, the scraper ring further includes a downstream face disposed opposite the planar upstream face that includes a male chevron portion. The male chevron may engage with corresponding portions of adjacent rings to provide sealing support and redundancy. Likewise, in some embodiments, the scraper ring may include a planar exterior surface that extends orthogonally from the planar downstream face. This may provide an interference fit with a pump casing and/or ease insertion of the scraper ring into the pump casing. Finally, in some embodiments, the scraper ring does not include a pedestal.

In accordance with another embodiment, the present application is directed to a packing arrangement for a fluid end of a reciprocating pump. The packing arrangement is installable within a packing box disposed at the fluid end and is arranged to form a seal with a plunger of the reciprocating pump. The packing arrangement includes a junk ring, one or more pressure rings, and a scraper ring. The junk ring is disposed at a high pressure end of the packing box and defines a planar downstream surface. The one or more pressure rings disposed downstream of the junk ring. The scraper ring is disposed between the junk ring and the one or more pressure rings and may include any combination of the features of the scraper ring described above.

In some embodiments, the packing arrangement may also include a packing nut disposed downstream of the one or more pressure rings and configured to compress the one or more pressure rings and the scraper ring to cause radial expansion of the one or more pressure rings and the scraper ring within the packing box. Among other advantages, this may secure the scraper ring in a sealed position that prevents blow-by leakage. Additionally or alternatively, the packing arrangement may include a lantern ring disposed between the one or more pressure rings and the packing nut. The lantern ring defines one or more lube oil bores that allow lubricant to be delivered to an outer surface of the plunger, which ensures the sealing rings (i.e., the pressure rings and scraper rings) can form a proper seal against a reciprocating plunger.

In accordance with another embodiment, the present application is directed to a reciprocating pump include a casing defining a pumping chamber, a plunger configured to reciprocate in an axial direction within the pumping chamber, and an annular scraper ring that can form a seal with the plunger. The annular scraper ring may include any combination of the features of the scraper ring described above.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Generally, the scraper ring presented herein improves upon existing sealing arrangements for high pressure reciprocating pumps by improving debris control adjacent the plunger. Additionally, when the scraper ring presented herein is used as the first ring of a packing, the scraper ring may have an extended lifespan as compared to other rings typically used as the first ring. To improve debris control, the scraper ring includes a sharp, highly compressed leading edge. The sharp leading edge peels debris off the plunger. Meanwhile, the shape of the scraper ring focuses the largest concentration of seal compression forces at or adjacent the front face of the seal, forming a strong seal that protects both downstream portions of the scraper ring and downstream rings from high pressure debris. Additionally, the scraper ring presented herein does not include a pedestal. Instead, an upstream face of the scraper ring defines the maximum width of the scraper ring. This also helps extend the lifespan of the scraper ring, as is explained in further detail below.

Figure 1:
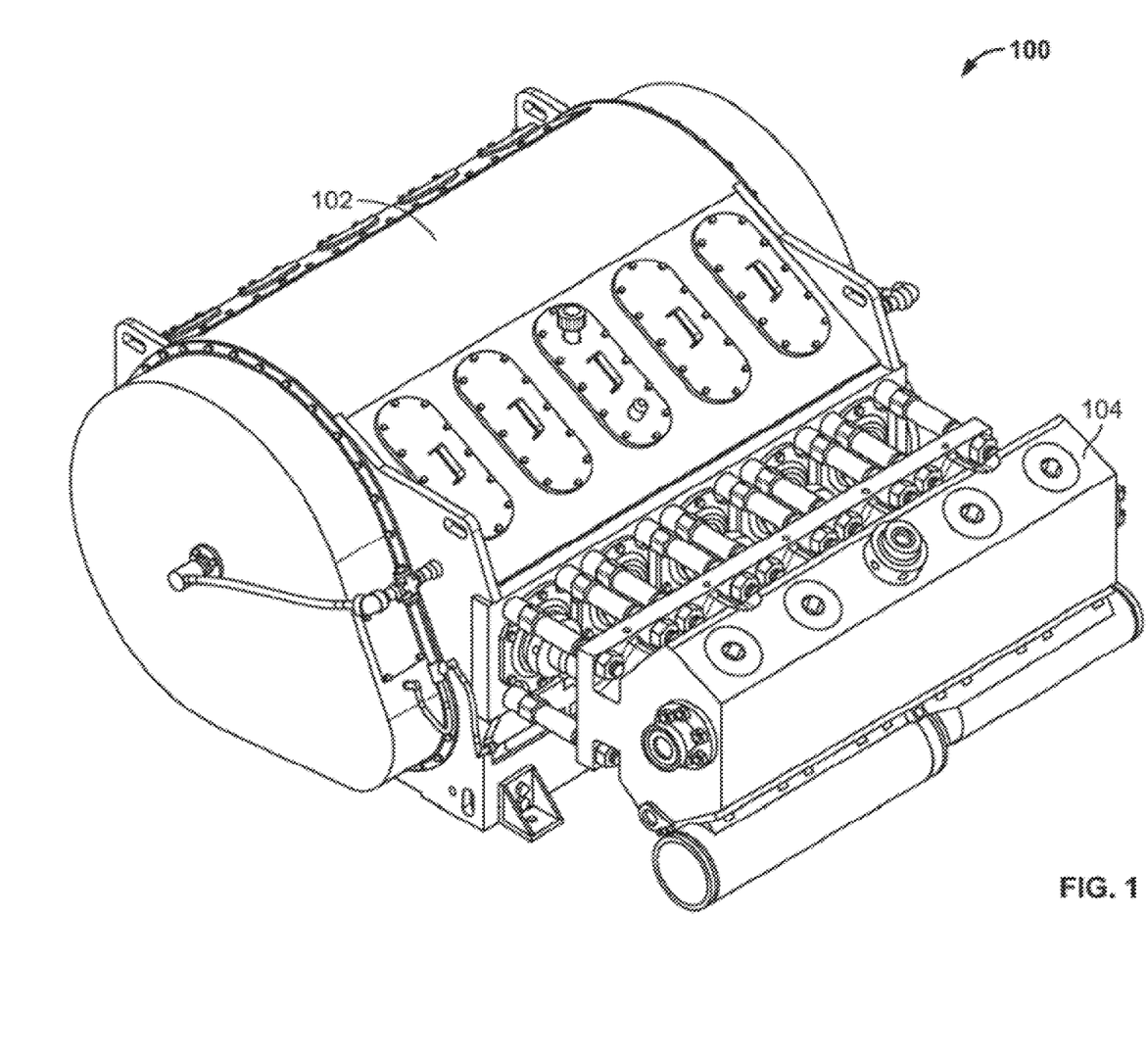
FIG. 1 is a perspective view of a reciprocating pump including a fluid end.

Now referring to FIG. 1 for a description of an exemplary embodiment of a reciprocating pump 100 in which the scraper ring presented herein may be included. The reciprocating pump 100 includes a power end 102 and a fluid end 104. The power end 102 includes a crankshaft that drives a plurality of reciprocating plungers within the fluid end 104 to pump fluid at high pressure. Generally, the power end 102 is capable of generating forces sufficient to cause the fluid end 104 to deliver high pressure fluids to earth drilling operations. For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations.

Often, the reciprocating pump 100 may be quite large and may, for example, be supported by a semi-tractor truck ("semi") that can move the reciprocating pump 100 to and from a well. For example, in some instances, a semi may move the reciprocating pump 100 off a well when the reciprocating pump 100 requires maintenance. However, a reciprocating pump 100 is typically moved off a well only when a replacement pump (and an associated semi) is available to move into place at the well, which may be rare. Thus, often, the reciprocating pump is taken offline at a well and maintenance is performed while the reciprocating pump 100 remains on the well. If not for this maintenance, the reciprocating pump 100 could operate continuously to extract natural oil and gas. Consequently, any improvements that extend the lifespan of components of the reciprocating pump 100, especially typical "wear" components, and extend the time between maintenance operations (i.e., between downtime) are highly desirable.

Figure 2:
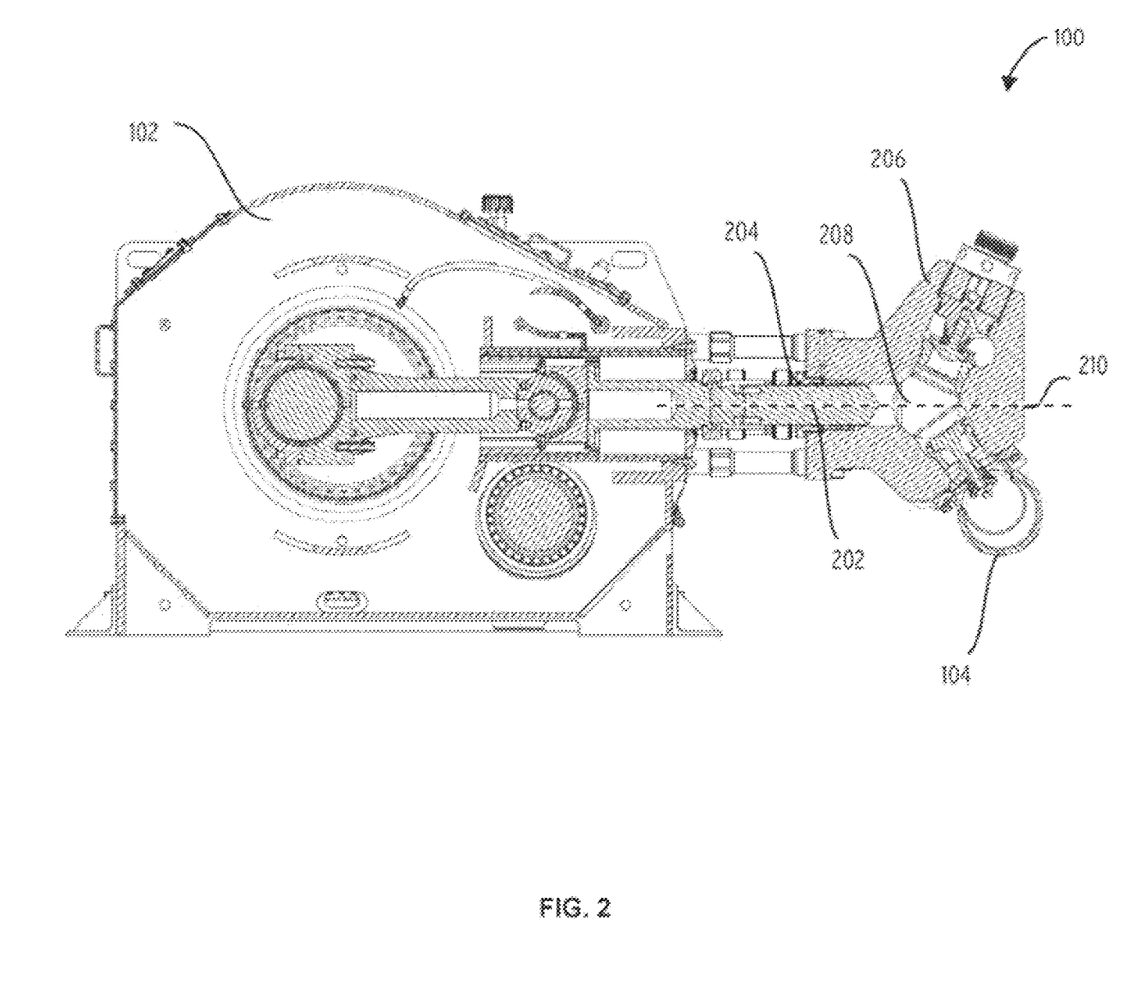
FIG. 2 is a cross sectional view of the reciprocating pump of FIG. 1, taken along a plane that is parallel to a plunger axis.

FIG. 2 is a sectional view taken through a central or plunger axis 210 of one of the plungers 202. Each of the pumping chambers 208 of the reciprocating pump 100 includes a plunger 202 that reciprocates within a casing 206 of the fluid end 104. With each stroke of the plunger 202, low pressure fluid is drawn into the pumping chamber 208 and high pressure fluid is discharged. Often, the fluid within the pumping chamber 208 contains abrasive material (i.e., "debris") that can damage the reciprocating pump 100. Thus, a packing arrangement 204 is positioned between the casing 206 and the plunger 202 to form a seal therebetween.

In such a reciprocating pump 100, the stroke length of the plunger 202 may be relatively short and, thus, only a limited amount of axial space is available for the packing arrangement 204. That is, due to the small stroke length, gas and oil reciprocating pumps for which the scraper ring presented herein are intended have a constrained linear space for a sealing arrangement. For example, the stroke length may be between approximately six and approximately twelve inches. Typically, this space must be used to ensure proper seals are achieved between the packing arrangement 204, the casing 206, and the plunger 202, especially in view of the high pressures present within the reciprocating pump 100, and little space is left available to try to address additional issues, such as debris control.

For example, conventional packing arrangements for short-stroke pumps have been unable to incorporate wiper seals that are often included in equipment that applies hydraulic loads (e.g., construction equipment), which often have longer stroke lengths that provide more room for sealing elements and/or provide seals against significantly lower pressures. This limits the effectiveness with which conventional packing arrangements may remove or detach debris from a plunger 202, which, in turn, limits the effectiveness and/or the lifespan of conventional packing arrangements. In fact, as fracking continues to be deployed in more extreme conditions, the pressure, flow rate, and amount of sand introduced into a well continues to increase by orders of magnitude. This generates more debris that conventional packing arrangements struggle to handle while further emphasizing the need for strong and effective seals in a small axial space.

Figure 3:
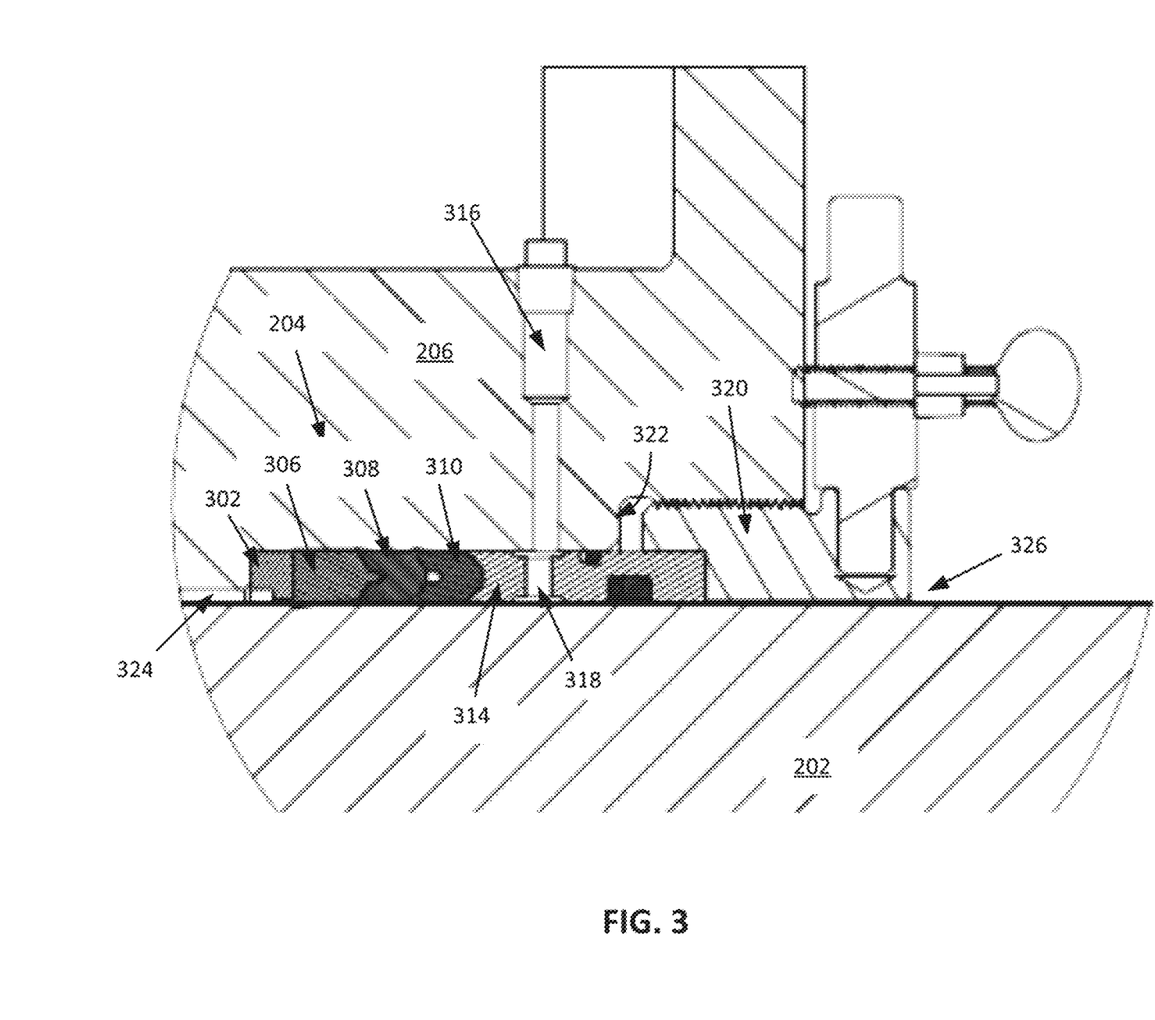
FIG. 3 is an enlarged view of a portion of the cross sectional view of FIG. 2, the enlarged view illustrating a first example embodiment of a packing arrangement included in the fluid end of the reciprocating pump that includes a first example embodiment of the scraper ring presented herein.
Figure 4:
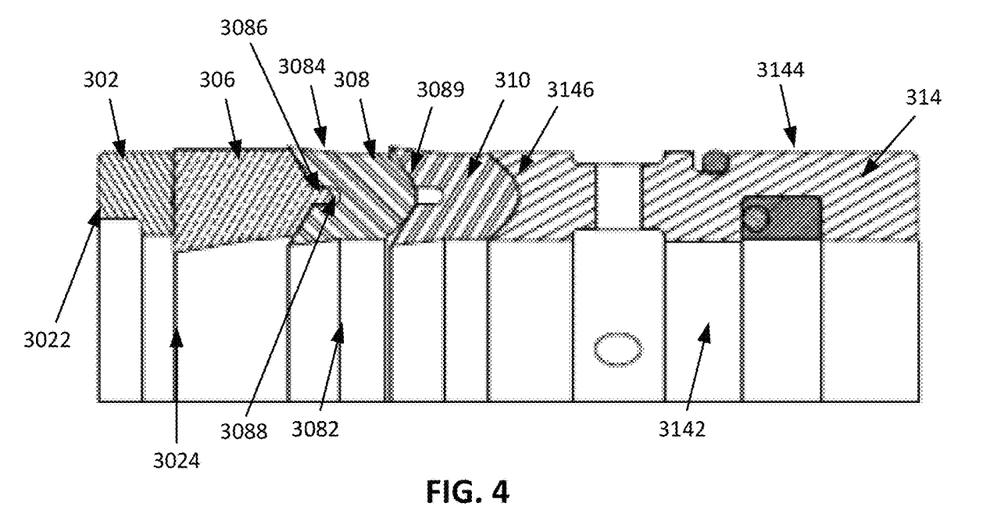
FIG. 4 is an enlarged cross sectional view of the packing arrangement of FIG. 3 when removed from the reciprocating pump.

FIGS. 3 and 4 show an example embodiment of a packing arrangement 204. In FIG. 3, the packing arrangement 204 is illustrated within a packing box 322 that is formed as part of the casing 206 of the fluid end 104 of reciprocating pump 100. Meanwhile, in FIG. 4, the packing arrangement 204 is illustrated independent of the casing 206. As is discussed in detail below, when the packing arrangement 204 is disposed in the casing 206, compression of the packing arrangement 204 causes the packing arrangement 204 to seal against the casing 206 and the plunger 202. Regardless, overall, the packing arrangement 204 includes a junk ring 302, a scraper ring 306, a first pressure ring 308, a second pressure ring 310, a lantern ring 314, and a packing nut 320.

Before discussing the packing arrangement 204 in detail it is important to understand the terms "upstream" and "downstream." Any flow through the packing arrangement 204 or between the packing arrangement 204 and the plunger 202 flows from a high pressure side 324 of the packing box 322 to a low pressure side 326. Thus, if a first component is described as being "upstream" of a second component, the first component will be closer to the high pressure side 324 than the second component. Likewise, if a first component is described as being "downstream" of a second component, the first component will be closer to the low pressure side 326 than the second component.

That said, the junk ring 302 is positioned within the packing box 322 adjacent the high pressure side 324 and is preferably made of a hard material, such as steel. The junk ring 302 is annular in shape with a cylindrical inside surface and a cylindrical outside surface. However, the inner surface and outer surface may have radial (i.e., lateral) dimensions that are at least slightly smaller than the remaining components of the packing arrangement (e.g., scraper ring 306, first pressure ring 308, and second pressure ring 310) to ensure that the hard material of the junk ring 302 has appropriate clearances within the packing box 322. However, the radial dimensions of the junk ring are primarily selected to reduce the size of the gap between the casing 206 and the plunger 202 so that high pressure fluid acts on a smaller annular portion of a ring immediately downstream of the junk ring 302 (e.g., scraper ring 306).

The junk ring 302 also includes a stepped upstream surface 3022 (also referred to as a leading surface or lead surface) that abuts a planar surface of the packing box 322 that defines the high pressure side 324. In the depicted embodiment, each stepped portion of the leading surface 3022 (see FIG. 4) is substantially flat or planar. Opposite the upstream surface 3022 is a substantially flat or planar downstream surface 3024 (see FIG. 4). The scraper ring presented herein (e.g., scraper ring 306) abuts the planar downstream surface 3024.

In the depicted embodiment, the remainder of the packing arrangement 204 is disposed downstream of the scraper ring 306. Specifically, in the depicted embodiment, the first pressure ring 308 is downstream of the scraper ring 306, the second pressure ring 310 is downstream of the first pressure ring 308, the lantern ring 314 is downstream of the second pressure ring 310, and the packing nut 320 is downstream of the lantern ring 314. However, in other embodiments, the packing arrangement might include any combination of components arranged in any order. For example, an alternative embodiment might include only one pressure ring, three or more pressure rings, any number of support rings, or other such rings; and each of these components may have suitable axial dimensions to collectively span the axial distance between the junk ring 302 and the packing nut 320 (each of which might also have varied dimensions across different embodiments).

In the depicted embodiment, the first pressure ring 308 is an annular ring that includes a tapered cylindrical inner surface 3082 that abuts the plunger 202 and a tapered cylindrical outer surface 3084 that abuts the bore of the packing box 322. An upstream (high pressure) side 3086 of the first pressure ring 308 includes a female chevron portion arranged to receive the male chevron portion of the scraper ring 306 (see FIG. 4). An aperture 3088 is formed in the female chevron portion and provides a relief space that allows the legs of the female chevron portion to flex inwards in response to compression (e.g., generated by the rigid sides of the bore 318 and the plunger 202).

The downstream (low pressure) side 3089 of the first pressure ring 308 includes a male chevron portion with an apex that extends toward the low pressure end 326 of the packing box 322. In at least some embodiments, the male chevron portion and the female chevron portion have like dimensions so that the downstream side 3089 of first pressure ring 308 matches or mirrors the upstream side 3086 of the first pressure ring 308. However, the downstream side 3089 need not necessarily match or mirror the upstream side 3086.

In the depicted embodiment, the second pressure ring 310 is identical to the first pressure ring 308. However, in other embodiments, the second pressure ring 310 could have different dimensions as compared to the first pressure ring 308. For example, the second pressure ring 310 could have a different height (insofar as "height" refers to a dimension spanning the flow direction), upstream chevron shape, aperture shape, aperture size, and/or downstream chevron shape as compared to the first pressure ring 308.

Regardless of the dimensions, features, and/or characteristics of pressure rings 308 and 310, pressure rings 308 and 310 may be the primary sealing components of the packing arrangement 204, bearing the brunt of the pressure applied by the high pressure fluid within the pumping chamber 208. Therefore, the pressure rings 308, 310 may be stiff or inflexible and lack springiness, at least as compared to the scraper ring 306. For example, in at least some embodiments, the first pressure ring 308 and the second pressure ring 310 are formed from an elastomer impregnated aramid fabric, but in other embodiments, one or both of pressure ring 308 and pressure ring 310 may be formed from other suitable materials.

The lantern ring 314 is an elongated annular ring that includes an inner cylindrical surface 3142 that abuts the plunger and an outer cylindrical surface 3144 that abuts the inner surface of the packing box 322 (see FIG. 4). The upstream (high pressure) side 3146 of lantern ring 314 includes a female chevron portion that is arranged to receive the male chevron portion of the second pressure ring 310 (see FIG. 4). In at least some embodiments, the lantern ring 314 is formed from a metal such as aluminum, bronze, or an aluminum-bronze alloy. Thus, the lantern ring 314 may, in at least some embodiments, include sealing elements (e.g., O-rings or annular seals) embedded therein (not labeled).

As shown best in FIG. 3, the lantern ring 314 may also include one or more lube oil bores 318 that extend between its inner surface and its outer surface to provide a flow path for lube oil that is delivered to the packing arrangement 204 via an oil passage 316 formed in casing 206. The lube oil creates a pressure seal that enhances the function of the packing arrangement 204 while also providing lubrication between the plunger 202 and the packing arrangement 204.

As is shown in FIG. 3, the packing nut 320 threadably engages the casing 206. The threaded engagement allows the packing nut 320 to compress the lantern ring 314 against the second pressure ring 310, the first pressure ring 308, and the scraper ring 306 (which are collectively referred to herein as a "stack"). This compression causes the stack to expand radially, towards the outer wall or bore of the packing box 322 and the outer surface of the plunger 202. This radial expansion creates seals between: (1) the stack and the outer wall or bore of the packing box 322; and (2) the stack and the outer surface of the plunger 202.

Figure 5:
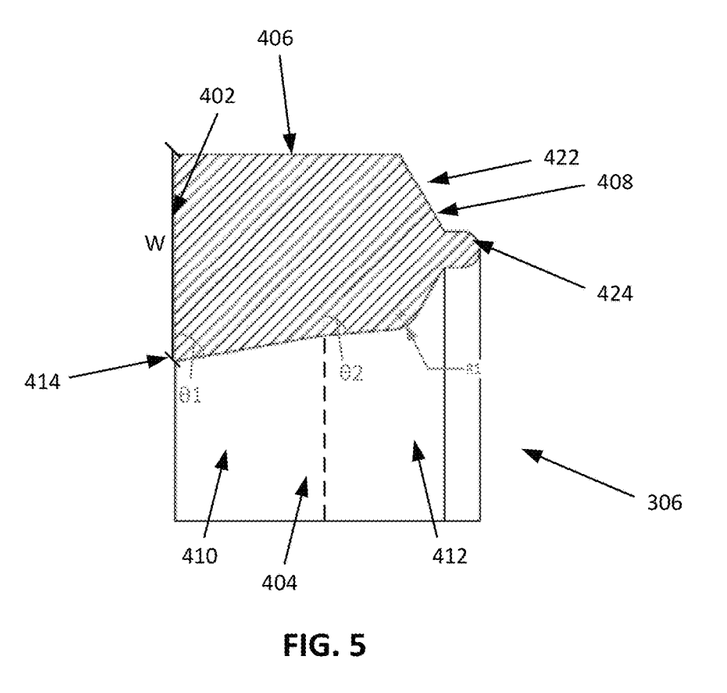
FIG. 5 is an enlarged cross sectional view of the scraper ring included in the packing arrangement of FIG. 3.

Now turning to FIG. 5, the scraper ring presented herein includes a geometry specifically designed to prevent, or at least discourage, debris from being trapped against the scraper ring and/or grinding against sealing areas of the scraper ring. For example, the scraper ring 306 shown in FIG. 5 includes a planar upstream face 402 with a width W that defines the widest or maximum width of the scraper ring 306, thereby ensuring that the scraper ring 306 does not have or define a pedestal. Thus, when the scraper ring 306 is used as the first ring of the stack, it may protect downstream rings, as well as downstream portions of the scraper ring, without exposing a pedestal to high pressure fluid and debris.

By comparison, many conventional rings that are used as the first ring of a stack have pedestals or steps defined in their upstream faces. In most of these conventional scraper rings with pedestals, the pedestals help ensure that pressure does not act away from the piston to cause "blowby leakage" that prevents sealing between the first ring and the piston. However, these pedestals also create a pocket of space adjacent the upstream face of the first ring in which debris can be trapped. Then, reciprocation of the plunger may cause this trapped debris to grind against and damage the first ring, accelerating seal wear and eventually leading to seal failure and leakage that requires pump maintenance (and likely down time). This phenomenon is known as "nibbling" and can significantly reduce the lifespan of the first ring.

To address pedestal nibbling, some conventional packing rings have attempted to strengthen the pedestal or adjacent portions of the packing ring. However, such solutions do not eliminate pedestal nibbling, they simply aim to slow the pedestal nibbling. Such solutions may also require expensive materials or manufacturing techniques. In contrast, the scraper ring presented herein does not include a pedestal and, thus avoids these issues entirely when used as the first ring in a stack. Instead, the scraper ring presented herein includes a planar upstream face 402 that defines the widest or maximum width of the scraper ring 306. Meanwhile, the geometry and/or the compression forces provided by the packing nut 320 may be adequate to prevent blowby leakage.

Moreover, and still referring to FIG. 5, the scraper ring presented herein has an inner surface with a tapered section that tapers away from the plunger along a downstream direction, thereby ensuring that the scraper ring is widest at the planar upstream face. For example, in FIG. 5, the inner surface 404 has a tapered section 410 that is directly connected to the planar upstream face 402. The tapered section 410 extends away from the planar upstream face 402 at an acute angle θ1 (e.g., less than 90°) so that it tapers away from the plunger 202. Put another way, the tapered section 410 tapers in a radial direction towards an exterior surface 406 of the scraper ring 306. This forms a sharp edge 414 between the inner surface 404 and the planar upstream face 402, insofar as "sharp" is used herein to describe an acute or right corner. The sharp leading edge 414 may peel or scrape debris off the plunger 202, which is advantageous because it protects any downstream rings from exposure to this damaging debris.

Figure 6:
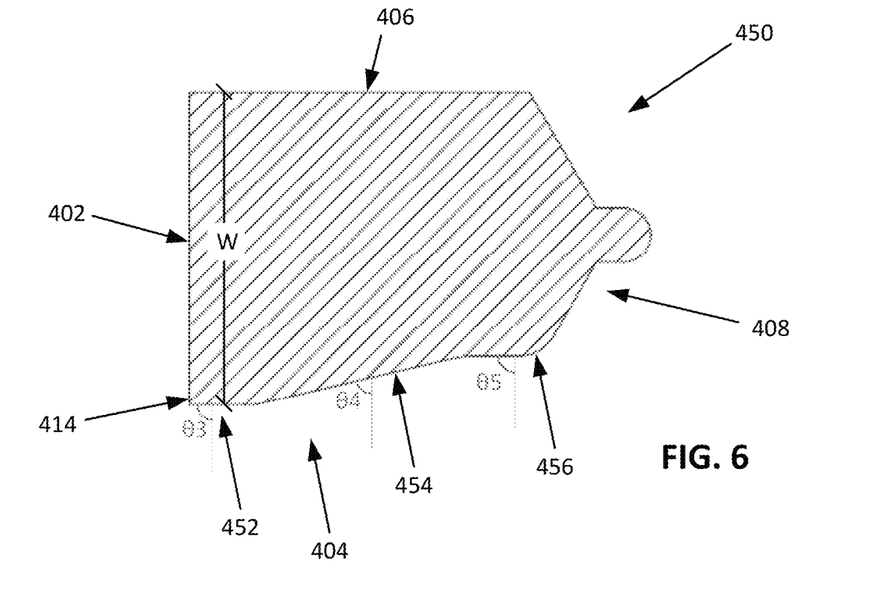
FIG. 6 is an enlarged cross sectional view of a second example embodiment of a scraper ring that may be included in the packing arrangement of FIG. 3.

In the depicted embodiment, angle θ1 is any angle in the range of approximately 77° to approximately 83°; however, in other embodiments, angle θ1 may be any angle over a range of approximately 75° to approximately 85°, approximately 60° to approximately 89° or even approximately 45° to approximately 89°. Moreover, in other embodiments, tapered section 410 need not extend directly from the planar upstream face 402. Instead, a cylindrical section may be disposed therebetween so that, for example, the scraper ring defines a first section of constant width adjacent the planar upstream face 402 and then tapers towards a narrower width, an example of which is shown in FIG. 6 and described below. Notably, even if a cylindrical section is disposed between the planar upstream face 402 and the tapered section 410, the planar upstream face 402 still defines the maximum width W of the scraper ring 306.

Since the width of the scraper ring 306 tapers from the planar upstream face 402, the magnitude of normal forces acting against the inner surface 404 during compression of the scraper ring 306 (e.g., via tightening packing nut 320) will decrease moving in a downstream direction along the tapered section 410. Put another way, when compression causes radial expansion of the scraper ring 306, the normal forces acting against the radial expansion will have the largest magnitude at the planar upstream face 402 of the scraper ring 306 (and potentially adjacent the planar upstream face 402 if a cylindrical section is disposed between the planar upstream face 402 and the tapered section 410). This concentration of strong sealing forces at the upstream edge of the scraper ring 306 creates a barrier that prevents debris from grinding into a sealing area in a middle axial portion of scraper ring 306 (i.e., a secondary sealing area of the scraper ring 306), prolonging seal life.

Still referring to FIG. 5, in at least some embodiments, the tapered section 410 spans only a portion of the inner surface 404 and the inner surface also includes a second section 412 between the tapered section 410 and its downstream face 408. In the embodiment depicted in FIG. 5, the second section 412 is a second tapered section, with a steeper taper than the first tapered section 410. That is, the second section 412 has an interior taper angle θ2 (depicted with respect to a dashed reference line that forms no portion of scraper ring 306) that is larger than taper angle θ1. Specifically, in the depicted embodiment, taper angle θ2 is any angle in the range of approximately 82° to approximately 88°; however, in other embodiments, angle θ2 may be any angle over a range of approximately 80° to approximately 89°, approximately 75° to approximately 89° or even approximately 60° to approximately 89°, and may be larger or smaller than taper angle θ1.

Moreover, in at least some embodiments, the second section 412 need not be tapered and, instead, may be a cylindrical section (i.e., have an angle of 90°). Still further, both the second section 412 and the taper section 410 need not have a single linear taper and, in some embodiments, can have multiple slopes or subsections, whether linear, curved (e.g., parabolic), or shaped in any other way. Additionally or alternatively, the inner surface 404 may include any number of sections. In fact, FIG. 6 illustrates an example inner surface 404 with three sections and FIG. 7 illustrates an inner surface 404 with four sections.

As has been mentioned, scraper ring 306 also includes an exterior surface 406 and a downstream face 408. In the depicted embodiment, the exterior surface 406 is orthogonal to the planar upstream face 402; however, in other embodiments, the exterior surface 406 may have any shape that is suitable for an exterior of a packing ring, whether now known or developed hereafter. Similarly, in the depicted embodiment, the downstream face 408 has a male chevron 422 with a protrusion 424 extending from an apex of the male chevron 422, but in other embodiments, the downstream face 408 may have any shape that is suitable for a downstream face of a packing ring, whether now known or developed hereafter.

For example, the downstream face 408 may have any configuration that allows the scraper ring 306 to mate, interface, couple, seat against, or otherwise be packed with any other desirable packing rings. That said, in the depicted embodiment, the upstream side 3086 of the first pressure ring 308 has a female chevron with an aperture 3088 so the male chevron 422 and protrusion 424 included on the downstream face 408 of the scraper ring may mate appropriately with the remainder of the stack via the first pressure ring 308 for additional seal redundancy. Moreover, in the depicted embodiment, the downstream face 408 is connected to the inner surface 404 by a radius R1 in a range of approximately 0.055 inches to approximately 0.095 inches; however, in other embodiments, radius R1 may be any size or this connection may be a sharp corner.

Figure 7:
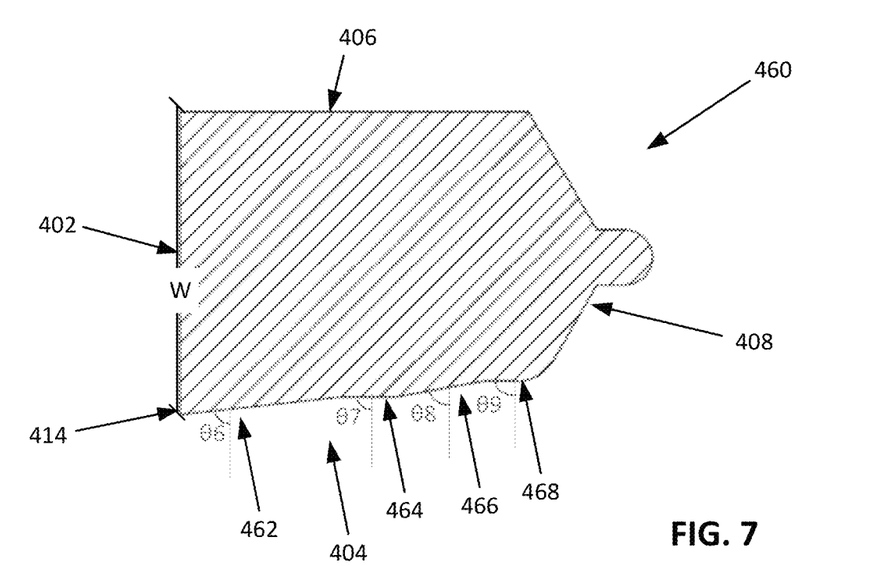
FIG. 7 is an enlarged cross sectional view of a third example embodiment of a scraper ring that may be included in the packing arrangement of FIG. 3.

Now turning to FIGS. 6 and 7, these Figures illustrate alternative embodiments of scraper ring 306. As mentioned above, these alternative embodiments include different inner surfaces 404 as compared to the embodiment of FIG. 5; however, otherwise, the alternative embodiments are largely the same. Thus, for brevity, the description of FIGS. 6 and 7 focuses on the inner surface 404 and remaining parts or features of these alternative embodiments are labeled with like reference numerals from FIG. 5. Any description of like numerals included herein should be understood to apply to like components or features of FIGS. 6 and 7.

First, in FIG. 6, the scraper ring 450 includes an inner surface 404 with three sections: a first section 452; a second section 454; and a third section 456. The first section 452 is a cylindrical section, such that θ3 is 90°, and spans a first axial distance of the inner surface 404, such as 25% or less of the axial distance. This may provide an axial section adjacent upstream face 402 that experiences the maximum compression forces generated during compression. The second section 454 is a tapered section that has a taper angle θ4. Taper angle θ4 may be substantially similar to taper angle θ1 from scraper ring 306; thus, taper angle θ4 may be any angle over a range of approximately 77° to approximately 83°, a range of approximately 75° to approximately 85°, approximately 60° to approximately 89° or even approximately 45° to approximately 89°. The third section 456 is another cylindrical section, such that θ5 is 90°, and spans a second axial distance of the inner surface 404 to provide a flat transition from the second section 454 to the downstream face 408.

Second, in FIG. 7, the scraper ring 460 includes an inner surface 404 with four sections: a first section 462; a second section 464; a third section 466; and a fourth section 468. The first section 462 is a tapered section that has a taper angle θ6. Taper angle θ6 may be substantially similar to taper angle θ1 from scraper ring 306; thus, taper angle θ6 may be any angle over a range of approximately 77° to approximately 83°, a range of approximately 75° to approximately 85°, approximately 60° to approximately 89° or even approximately 45° to approximately 89°. The second section 464 is a cylindrical section, such that θ7 is 90°, and spans a first axial distance of the inner surface 404 to provide a transition between the first section 462 and the third section 466. The third section 466 is a tapered section that has a taper angle θ8. Taper angle θ8 may be substantially similar to taper angle θ2 from scraper ring 306; thus, taper angle θ8 may be any angle over a range of approximately 82° to approximately 88°, approximately 80° to approximately 89°, approximately 75° to approximately 89° or even approximately 60° to approximately 89°, and may be larger or smaller than taper angle θ1. The fourth section 468 is another cylindrical section, such that θ9 is 90°, and spans a second axial distance of the inner surface 404 to provide a flat transition from the third section 466 to the downstream face 408.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. For example, inner surface sections from one embodiment may be combined with inner surface sections from another embodiment to form a complete inner surface. Accordingly, it is appropriate that the appended claims be construed broadly and in a manner consistent with the scope of the disclosure as set forth in the following claims.

It is also to be understood that the scraper ring described herein, or portions thereof may be fabricated from any commonly used seal materials, such as homogeneous elastomers, filled elastomers, partially fabric reinforced elastomers, and full fabric reinforced elastomers. Suitable resilient elastomeric materials includes, but re not limited to, thermoplastic polyurethane (TPU), thermoplastic copolyester (COPE), ethylene propylene diene monomer (EPDM), highly saturated nitrile rubber (HNBR), reinforced versions of the foregoing materials, such as versions reinforced with fibers or laminations of woven material, as well as combinations of any of the foregoing materials.

Similarly, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The invention claimed is:

1. A packing arrangement for a fluid end of a reciprocating pump, the reciprocating pump comprising a pumping chamber, the packing arrangement being installable within a packing box disposed at the fluid end and being arranged to form a seal with a plunger of the reciprocating pump, the plunger being configured to move relative to the pumping chamber to draw low pressure fluid into the pumping chamber and discharge high pressure fluid from the pumping chamber, the packing box comprising a high pressure end facing the pumping chamber of the reciprocating pump, and the packing arrangement comprising:
  a junk ring disposed at the high pressure end of the packing box, the junk ring defining a planar downstream surface facing away from the pumping chamber of the reciprocating pump;
  one or more pressure rings disposed downstream of the junk ring away from the pumping chamber; and
  a scraper ring disposed between the junk ring and the one or more pressure rings, the scraper ring including:
    a planar upstream face configured to abut the planar downstream surface of the junk ring, the planar upstream face facing toward the pumping chamber of the reciprocating pump; and an inner surface with a tapered section that tapers away from the plunger along a downstream direction away from the pumping chamber so that the scraper ring is widest at the planar upstream face.

2. The packing arrangement of claim 1, further comprising:
a packing nut disposed downstream of the one or more pressure rings and configured to compress the one or more pressure rings and the scraper ring to cause radial expansion of the one or more pressure rings and the scraper ring within the packing box.

3. The packing arrangement of claim 2, further comprising:
a lantern ring disposed between the one or more pressure rings and the packing nut, the lantern ring defining one or more lube oil bores that allow lubricant to be delivered to an outer surface of the plunger.

4. The packing arrangement of claim 1, wherein the tapered section of the inner surface of the scraper ring begins to taper at the planar upstream face.

5. The packing arrangement of claim 1, wherein the inner surface of the scraper ring further comprises:
a cylindrical section disposed between the planar upstream face and the tapered section, wherein the tapered section begins to taper at a downstream edge of the cylindrical section.

6. The packing arrangement of claim 1, wherein the tapered section of the inner surface of the scraper ring is a first tapered section and the inner surface further comprises:
a second tapered section disposed between the first tapered section and a downstream face of the scraper ring, the downstream face being opposite the planar upstream face.

7. The packing arrangement of claim 1, wherein the inner surface of the scraper ring further comprises:
a cylindrical section disposed between the tapered section and a downstream face of the scraper ring, the downstream face being opposite the planar upstream face.

8. The packing arrangement of claim 1, wherein the scraper ring further comprises:
a downstream face disposed opposite the planar upstream face, the downstream face including a male chevron portion.

9. The packing arrangement of claim 1, wherein the scraper ring further comprises:
a planar exterior surface that extends orthogonally from the planar upstream face.

10. The packing arrangement of claim 1, wherein the scraper ring does not include a pedestal.

11. An annular scraper ring for a packing arrangement that can form a seal with a plunger included in a fluid end of a reciprocating pump, the reciprocating pump comprising a pumping chamber, the plunger being configured to move relative to the pumping chamber to draw low pressure fluid into the pumping chamber and discharge high pressure fluid from the pumping chamber, and the annular scraper ring comprising:
a planar upstream face facing toward the pumping chamber of the reciprocating pump; and
an inner surface with a tapered section that tapers away from the plunger along a downstream direction away from the pumping chamber so that the annular scraper ring is widest at the planar upstream face.

12. The annular scraper ring of claim 11, wherein the tapered section of the inner surface begins to taper at the planar upstream face.

13. The annular scraper ring of claim 11, wherein the inner surface further comprises:
a cylindrical section disposed between the planar upstream face and the tapered section, wherein the tapered section begins to taper at a downstream edge of the cylindrical section.

14. The annular scraper ring of claim 11, wherein the tapered section is a first tapered section and the inner surface further comprises:
a second tapered section disposed between the first tapered section and a downstream face of the annular scraper ring, the downstream face being opposite the planar upstream face.

15. The annular scraper ring of claim 14, wherein the inner surface further comprises:
a cylindrical section disposed between the first tapered section and the second tapered section, wherein the second tapered section begins to taper at a downstream edge of the cylindrical section, and the first tapered section terminates at an upstream edge of the cylindrical section.

16. The annular scraper ring of claim 11, wherein the inner surface further comprises:
a cylindrical section disposed between the tapered section and a downstream face of the annular scraper ring, the downstream face being opposite the planar upstream face.

17. The annular scraper ring of claim 11, further comprising:
a downstream face disposed opposite the planar upstream face, the downstream face including a male chevron portion.

18. The annular scraper ring of claim 11, further comprising:
a planar exterior surface that extends orthogonally from the planar upstream face.

19. A reciprocating pump, comprising:
a casing defining a pumping chamber;
a plunger configured to reciprocate in an axial direction within the pumping chamber to draw low pressure fluid into the pumping chamber and discharge high pressure fluid from the pumping chamber; and
an annular scraper ring that can form a seal with the plunger, comprising:
a planar upstream face facing toward the pumping chamber; and
an inner surface with a tapered section that tapers away from the plunger along a downstream direction away from the pumping chamber so that the annular scraper ring is widest at the planar upstream face.

20. The reciprocating pump of claim 19, wherein the tapered section of the inner surface of the annular scraper ring begins to taper at the planar upstream face.

* * * * *